Patented July 30, 1929.

1,722,343

UNITED STATES PATENT OFFICE.

GUSTAV SCHMAUS, OF PRAGUE, CZECHOSLOVAKIA.

LIQUID FOR ACCUMULATORS.

No Drawing. Application filed August 20, 1928, Serial No. 300,951, and in Czechoslovakia September 29, 1927.

Up to the present time accumulators have been filled with sulphuric acid of predetermined density, and the charging of an accumulator has taken several hours.

With the sulphuric acid hitherto employed the electrodes have been eaten away and destroyed, so that the life of the accumulators has been a comparatively short one.

These electrodes are destroyed for the most part by the sulphate separated out from the sulphuric acid in crystalline form.

The foregoing drawbacks are remedied by the newly discovered liquid, in fact by the employment of the new liquid not only are no sulphates separated out in crystalline form, but the crystalline sulphates upon old plates are again decomposed and removed without any residue.

In addition to this, the newly discovered liquid does not freeze, so that it is not necessary to remove the batteries from a car during winter.

One of the principal advantages of the new liquid is that for a starting and lighting equipment, the accumulator need no longer be charged for several hours, but it suffices with the help of the new liquid to charge for from twenty to thirty minutes in order to operate the starting and lighting equipment of the motor car. After a period of charging of this short duration, a person is in a position to charge the accumulator constantly from the motor of the automobile itself.

According to the essential principle of the invention, ammonium—and aluminium salts, together with a basic acetate are mixed with the sulphuric acid. The liquid can be suitably coloured by means of organic colouring material.

*Method of employment.*—If it is desired to charge with this new liquid the accumulator of an automobile which has already been in use, in the first place the old acid solution is removed from the battery, and this latter is thoroughly washed out with distilled water. After this each cell is filled with the new liquid, until the plates are entirely submerged. The motor is then connected up and charging takes place for twenty minutes at 10 amperes. The accumulator is continually filled up with the distilled water according to requirements.

*Example of the acid solution.*—For the preparation of one litre of the liquid the following proportions and materials may be employed:—

730 ccm. (cubic centimetres) distilled water ($H_2O$).
240 ccm. chemically pure sulphuric acid ($H_2SO_4$).
5 ccm. basic aluminium acetate ($AlOHC_2H_5O_2$).
4 g. (grammes) ammonium sulphate ($NH_4 2SO_4$).
18 g. Anhydrous aluminium sulphate ($AlOHC_2H_5O_2$).

What I claim and desire to secure by Letters Patent in the United States is:—

1. A liquid for filling accumulators prior to charging consisting of sulphuric acid with which are mixed ammonium and aluminium salts and a basic acetate.

2. A solution for filling accumulators prior to charging consisting of sulphuric acid with which are mixed distilled water, basic aluminium acetate, ammonium sulphate and anhydrous aluminium sulphate.

3. A solution for filling accumulators prior to charging consisting substantially of 730 ccm. distilled water, 240 ccm. chemically pure sulphuric acid, 5 ccm. basic aluminium acetate, 4 g. ammonium sulphate and 18 g. of anhydrous aluminium sulphate.

In testimony whereof I affix my signature.

GUSTAV SCHMAUS.